United States Patent [19]
Beach

[11] Patent Number: 5,734,496
[45] Date of Patent: Mar. 31, 1998

[54] LENS SYSTEM

[75] Inventor: Allan David Beach, Auckland, New Zealand

[73] Assignee: Her Majesty The Queen in Right of New Zealand, Parnell, New Zealand

[21] Appl. No.: 345,375

[22] Filed: Nov. 18, 1994

Related U.S. Application Data

[63] Continuation-in-part of Ser. No. 892,896, Jun. 3, 1992, abandoned.

[51] Int. Cl.$^6$ .......................... G02B 17/00; G02B 21/00
[52] U.S. Cl. ........................ 359/366; 359/365; 359/729; 359/731
[58] Field of Search ..................... 359/362–366, 359/434, 435, 663, 664, 726–732, 850–861, 210, 215

[56] References Cited

U.S. PATENT DOCUMENTS

| | | | |
|---|---|---|---|
| 2,403,660 | 7/1946 | Hayward | 359/729 |
| 2,458,132 | 1/1949 | Baker | 359/729 |
| 3,560,643 | 2/1971 | Love | 359/215 |
| 3,827,778 | 8/1974 | Wheeler | 359/365 |
| 4,043,643 | 8/1977 | Sigler | 359/729 |
| 4,101,195 | 7/1978 | Korsch | 359/729 |
| 4,331,390 | 5/1982 | Shafer | 359/731 |
| 4,469,414 | 9/1984 | Shafer | 359/366 |
| 4,624,538 | 11/1986 | MacFarlane | 359/365 |
| 4,768,869 | 9/1988 | Mercado | 359/731 |
| 4,971,428 | 11/1990 | Moskovich | 359/731 |
| 5,004,331 | 4/1991 | Haseltine et al. | 359/364 |
| 5,031,976 | 7/1991 | Shafer | 359/727 |
| 5,089,910 | 2/1992 | Sigler | 359/728 |

FOREIGN PATENT DOCUMENTS

| | | |
|---|---|---|
| 2934151A1 | 3/1980 | Germany. |
| 3033377A1 | 4/1981 | Germany. |
| 4301291A1 | 7/1994 | Germany. |
| 1689910A1 | 11/1991 | U.S.S.R. . |
| 2136149 | 9/1984 | United Kingdom. |

OTHER PUBLICATIONS

"An Improved Type of Schmidt Camera", Monthly Notices of the Royal Astronomical Society of London, vol. 105, Dec. 11, 1945, 334–344 by Dorothy G. Hawkins and E. H. Linfoot.

Catadioptric Imaging Systems, by Jonathan Maxwell; published by Adam Hilger, Ltd, London, England, 1972.

Primary Examiner—Thong Nguyen
Attorney, Agent, or Firm—Jacobson, Price, Holman & Stern, PLLC

[57] ABSTRACT

A lens system particularly suitable for low light, high speed applications has a primary mirror (31, 51) having a spherical reflecting surface and a secondary mirror (37, 52) having a spherical reflecting surface arranged to receive light reflected from the primary mirror. Both mirrors have the same center of curvature. The lens system includes image relay lens (47, 56) and a transfer lens (35, 55) arranged to image the center of curvature to a location at the center of the aperture stop (43, 57) of the image relay lens. This relay lens may include a spherical mirror located so that its center of curvature is coincident with the center of the aperture stop, thus creating a singular optical center of curvature for the whole lens system. The relay lens may include a meniscus corrector lens (33, 41, 42) which is located close to the aperture stop and which is also concentric with the common center of curvature. The size of the meniscus corrector lens is much smaller than the diameter of the lens system as a whole, conferring signficant advantages of costs and ease of fabrication.

19 Claims, 13 Drawing Sheets

INPUT BEAM SHOWN 1.5 DEGREES OFF-AXIS

LENS SYSTEM

This is a continuation-in-part of application Ser. No. 07/892,896, filed Jun. 3, 1992 which was abandoned upon the filing hereof.

FIELD OF THE INVENTION

This invention relates to an optical lens system and, optionally, an associated optical relay.

BACKGROUND OF THE INVENTION

Solid state imaging arrays (ccds, CIDs, etc.) have now become the sensors of choice in many applications.

Some CCD devices have been successfully fabricated with over $10^6$ operating pixels, each having dimensions <10 μm square. A good example is the Kodak Megapixel device, having 1035×1320 pixels of 6.8 μm square in a 7×9 mm array. Being planar, geometrically accurate (to the limit of microlithography technology) and with a high quantum efficiency in the visible and near-infrared spectral domains, such devices have the potential to be virtually perfect image detectors.

For the purpose of low-light-level imaging or astrography with CCD devices, the instrument designer's problem is to find an optical system with a matching performance, not only in exceptional resolution and distortion characteristics, but also in speed so as to achieve the highest possible information acquisition rate. When aperture diameters exceed 150 mm, the homogeneity of optical glass becomes an intrusive problem and design solutions usually reduce to catoptric or catadioptric systems which generally require only one refractive component of the full aperture diameter.

Few such systems exist which combine the characteristics of high speed (e.g. faster than f/4) and high—and uniform—resolution to the dimensional limit required by CCD pixel structures. If, to these notional constraints, there are added such pragmatic aspects as ease of fabrication and moderate tolerances, the list of suitable designs tends toward zero length.

The top of the list is occupied by the Schmidt camera and its variations; however, as design parameters tend towards higher speed and uniform flattened field resolution, the limitations of the full-aperture aspheric corrector become evident in the form of more difficult and expensive fabrication, significant residual sphero-chromatic aberration and obliquity effects.

Maksutov camera designs also suffer from problems associated with their massive full-aperture thick meniscus corrector component; to such an extent that the advantage of smaller obliquity effects is overridden by sphero-chromatism as the design speed is increased.

An additional obstacle which some low-light-level designs must surmount is the need to accommodate a cryostat for the CCD. Ideally this requires that the focus be accessible externally, which in turn implies a Cassegrain system, or at least a folded format.

This invention is an optical design which is novel in its assembly of known techniques into a format that fits a previously unoccupied area of the speed/diameter relationship. Furthermore, it is a high speed, optical system of economic construction.

BRIEF SUMMARY OF THE INVENTION

Accordingly, the invention consists in a lens system comprising a primary mirror having a spherical reflective surface; a secondary mirror having a spherical reflecting surface and being arranged to receive light reflected from the primary mirror, the secondary mirror having the same center of curvature as the primary mirror; and image receiving means situated on or adjacent the focal plane of the mirror system.

BRIEF DESCRIPTION OF THE DRAWINGS

The invention will now be described in detail with reference to the accompanying drawings wherein.

DETAILED DESCRIPTION OF THE INVENTION

Figure 1:
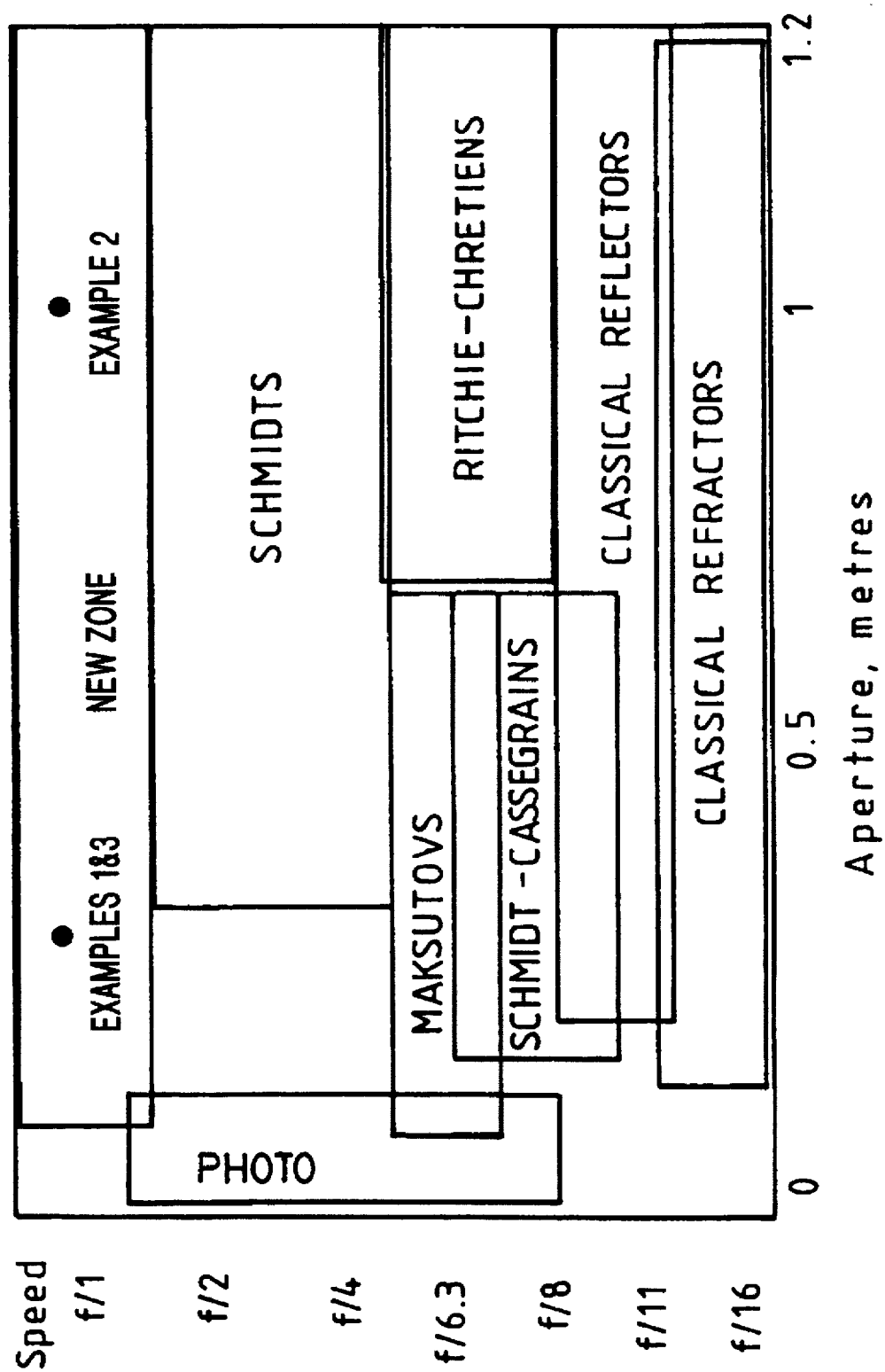
FIG. 1 is a diagram which shows a speed size relationship for astrocameras including an embodiment of the invention.

This invention is a concentric Cassegrain with a focal reducing relay, all critical surfaces being spherical. The relay described herein is also a concentric system and provides the f/1 speed characteristic at an external focus, but it should be noted that other relays can be used to give different speed/image-scale parameters.

More particularly, the present invention may broadly be said to consist in a lens system suitable for focusing substantially parallel incident light onto a detector, the system including (A) a concentric spherical Cassegrain-like system of two mirrors;

(B) a concentric spherical focal reducer;

(C) a transfer lens system which combines the concentricity of the Cassegrain-like system of two mirrors and of the concentric spherical focal reducer by imaging the first center of concentricity (that of the focal reducer) to thereby provide a single optically concentric system which combines their advantages;

(D) means to correct the sum of the spherical aberration of all of the spherical mirrors in the entire system; and (E) an aperture stop; and optionally (F) image detection means (hereafter "detector") at the focus of the focal reducer.

Preferably the concentric spherical Cassegrain-like system of two mirrors does not include any aperture stop.

Preferably the concentric spherical focal reducer includes at least one spherical mirror element.

Preferably the concentric spherical focal reducer includes at least one refractor element.

Preferably the transfer lens system is a refractive single lens.

Preferably the concentric spherical focal reducer is selected from the group comprising:

i. Modified forms of Baker camera (as described in U.S. Pat. No. 2,458,132, incorporated herein by reference);

ii. Modified form of Hawkins and Linfoot camera (as described in "An Improved Type of Schmidt Camera", by D. G. Hawkins and E. H. Linfoot, *Monthly Notices of the Royal Astronomical Society*, 105, 334 (1945)).

iii. Derivation of Maksutov or Bouwers camera.

Preferably the concentric spherical focal reducer is a modified form of the Hawkins and Linfoot camera system and the means to correct the sum of the spherical aberration of all of the spherical mirrors in the entire system and the aperture stop forms part thereof.

Preferably the means to correct the sum of this spherical aberration of all of the spherical mirrors in the entire system is a concentric meniscus concentric with the concentric focal reducer.

Preferably the chromatic aberration introduced by the concentric meniscus is compensated by a refractive component by a located at the aperture stop.

Preferably said refractive component is a zero-power chromatic doublet lens.

Alternatively said refractive component is a weakly positive power singlet lens.

Preferably said zero power refractive component includes an aspheric zonal corrector surface sufficiently weak not to introduce any substantial degree of focal difficulties when instant light is angled into the overall lens system other than axially.

Preferably the lens system is substantially faster than f/1.

Preferably the lens system is about f/0.8.

Preferably the detector is included.

Preferably the detector is a solid state detector.

Preferably the detector has a substantially planar detection surface.

In another aspect, the present invention may broadly be said to consist in a method of imaging onto a substantially planar detector surface selected from the group comprising solid state detection surfaces, photo-electric detection surfaces and chemical detection surfaces over a spectrum of light greater than visible light from an incident source of substantially parallel light.

FIG. 1 shows the ranges of apertures and speeds for which design types are appropriate. This invention is appropriate for the area labelled "New Zone".

Figure 2:
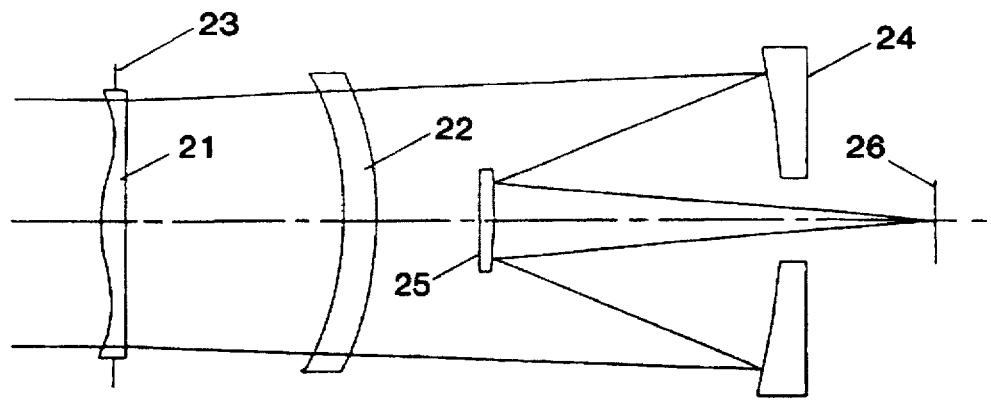
FIG. 2 is a schematic diagram of prior art concentric Cassegrain Schmidt or Maksutov cameras.

The starting point for the concept description is the concentric Cassegrain Schmidt or Maksutov camera designs shown in FIG. 2. These include an aperture stop 23, a primary mirror 24, a secondary mirror 25 and a focal surface 26. Apart from obliquity effects in the Schmidt aspheric corrector 21 or spherochromatism in the alternative Maksutov corrector 22, the image quality of this design is uniform over the whole field. The Schmidt corrector, located at the common center of curvature of the mirrors, has an axis of symmetry, as does the Maksutov meniscus in its achromatic forms. The fabrication penalties of these designs are the full-aperture aspheric or thick meniscus corrector and the length of the structure or tube required to support the corrector.

Figure 3:
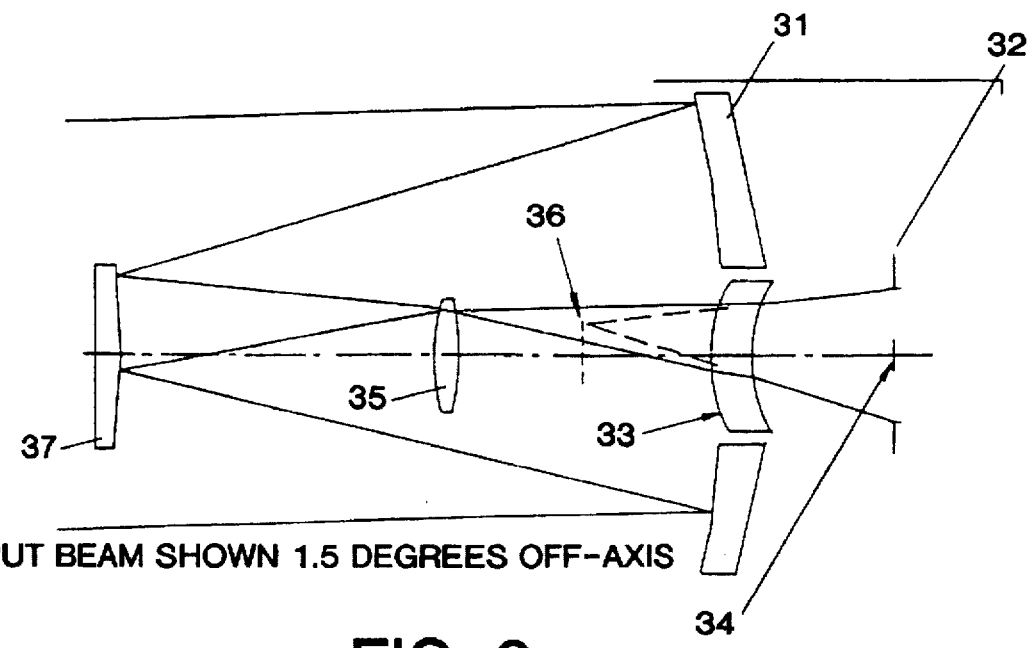
FIG. 3 is a schematic diagram of one embodiment of the invention.

Referring now to FIG. 3, if the corrector is omitted from these designs but the aperture stop left in position, at the center of curvature of the mirrors the obvious result is the introduction of severe spherical aberration at all field angles. If, now, a field lens 35 is introduced near the Cassegrain focal position, an image of the aperture stop and of the common center of curvature of the mirrors is created further behind the primary mirror 31. If a real aperture stop 32 is located coincident with this image, then it is axiomatic that the function of the classical Schmidt aperture stop (delineation of the marginal rays at all field angles), is duplicated, so that the classical stop can be eliminated. The common center of curvature of the mirrors, and the classical aperture stop have been optically transferred to the new location. An immediate advantage is the reduction of the camera length to about the same dimension as the primary/secondary separation. The spherical aberration can then be corrected by insertion of a meniscus component 33 concentric with the center of the new aperture stop 32, as this is now a new center of concentricity 34 optically transferred from the classical Schmidt location. This transfer of the center of concentricity is the prime function of the field lens 35, so it is termed the field/transfer lens in the remainder of this specification.

Note that the Cassegrain focus is relocated to a position between the two mirrors 31 and 37; the optical train is shortened overall by the small forward shift of the secondary mirror 37. The corrected image is virtual and is located at 36, between the relocated "cassegrain" focus and the correcting meniscus 33, because of the net negative power of the latter. To reestablish a real image requires a relay lens which should, of course, be placed with its entrance pupil coincident with the aperture stop. Clearly, numerous specification could be derived for relay lenses with differing conjugate ratios; the relay to be described here can reduce the relatively large virtual image to the dimensions typical of CCD devices, and shares the concentricity philosophy of the preceding optics, thus retaining the essential independence from off-axis aberrations.

Figure 4:
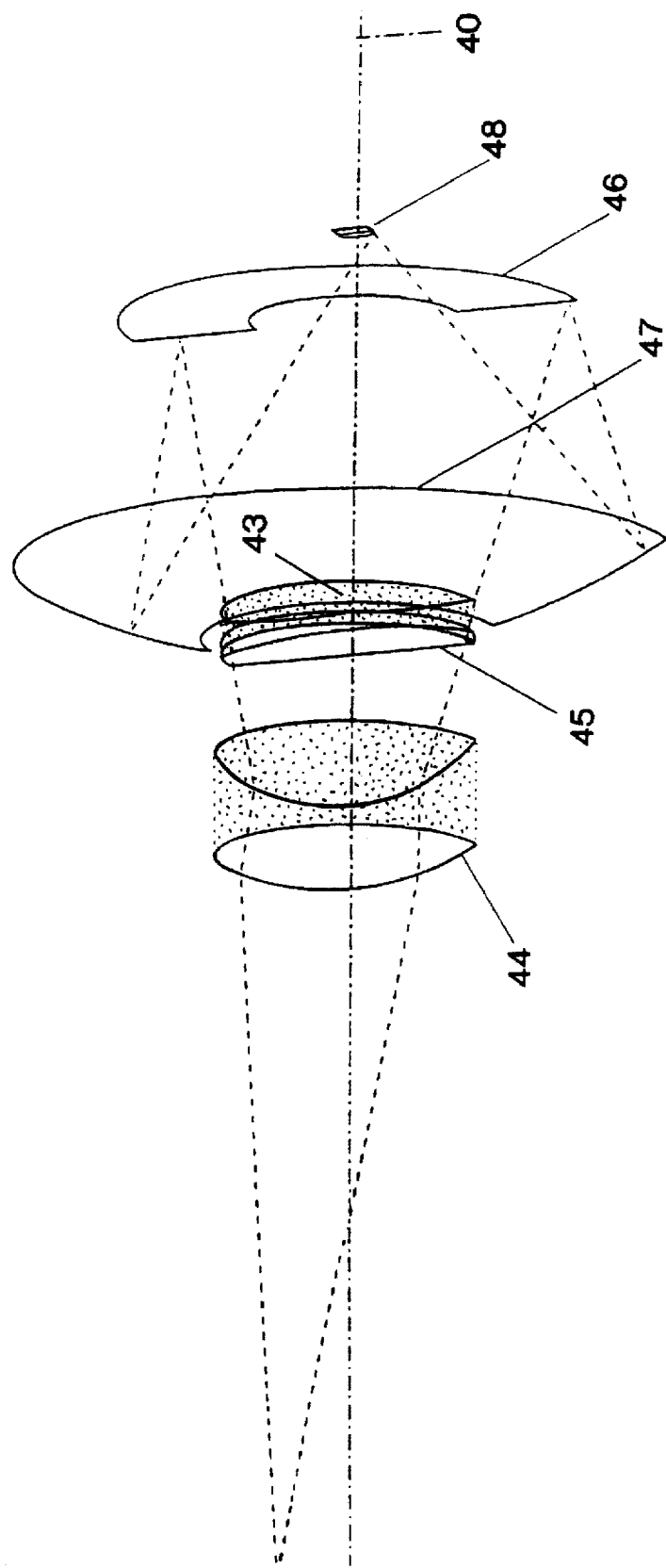
FIG. 4 is a schematic diagram of an optical relay optionally forming part of the invention.

Fast focal reducers are well know adducts for "slow" telescopes and small detector devices, but in this invention an unusually cooperative melding is possible between the subsystem described previously and the type of focal reducing relay shown in FIG. 4. The concentric meniscus 44 provides correction of the spherical aberration of the concave spherical mirror 47 independently of field angle and the same manner as described previously for the basic inventions subsystem.

The doublet 45 is afocal and introduces a chromatic error of the meniscus 44. Being located at the aperture stop, doublet 45 acts equally on all ray bundles so does not disturb the overall concentricity of the system.

The meniscus 44 is a weak negative lens and introduces a small amount of chromatic aberration. This is corrected by the zero-power doublet 45, located at the aperture stop of the system (32 in FIG. 3).

It should be noted that there are two centers of curvature in FIG. 4. The center of the aperture stop 43 is the center of curvature of the meniscus 44, but this center is reflected to the position 40 by the folding flat 46 and is the center of curvature of the relay mirror 47. This arrangement makes it possible to achieve an external focus for greater accessibility.

Field curvature is inherent in concentric designs, as is well known in Schmidt cameras especially, and can be corrected by the insertion of a field flattening lens 48 close to the focal surface, but, at least in the usual Schmidt geometries, only at the expense of introducing significant off-axis aberrations. However, as the numerical aperture (the speed) is increased, this problem is at least partially offset by the smaller scale of the focal surface geometry. In the embodiments described in this specification, the field flattening lenses are so weak as to add no significant degradation to the residual spherochromatic blur.

By merging the aperture stop of the relay and the transferred aperture stop of the new subsystem, the fast imaging system is assembled.

Figure 5:
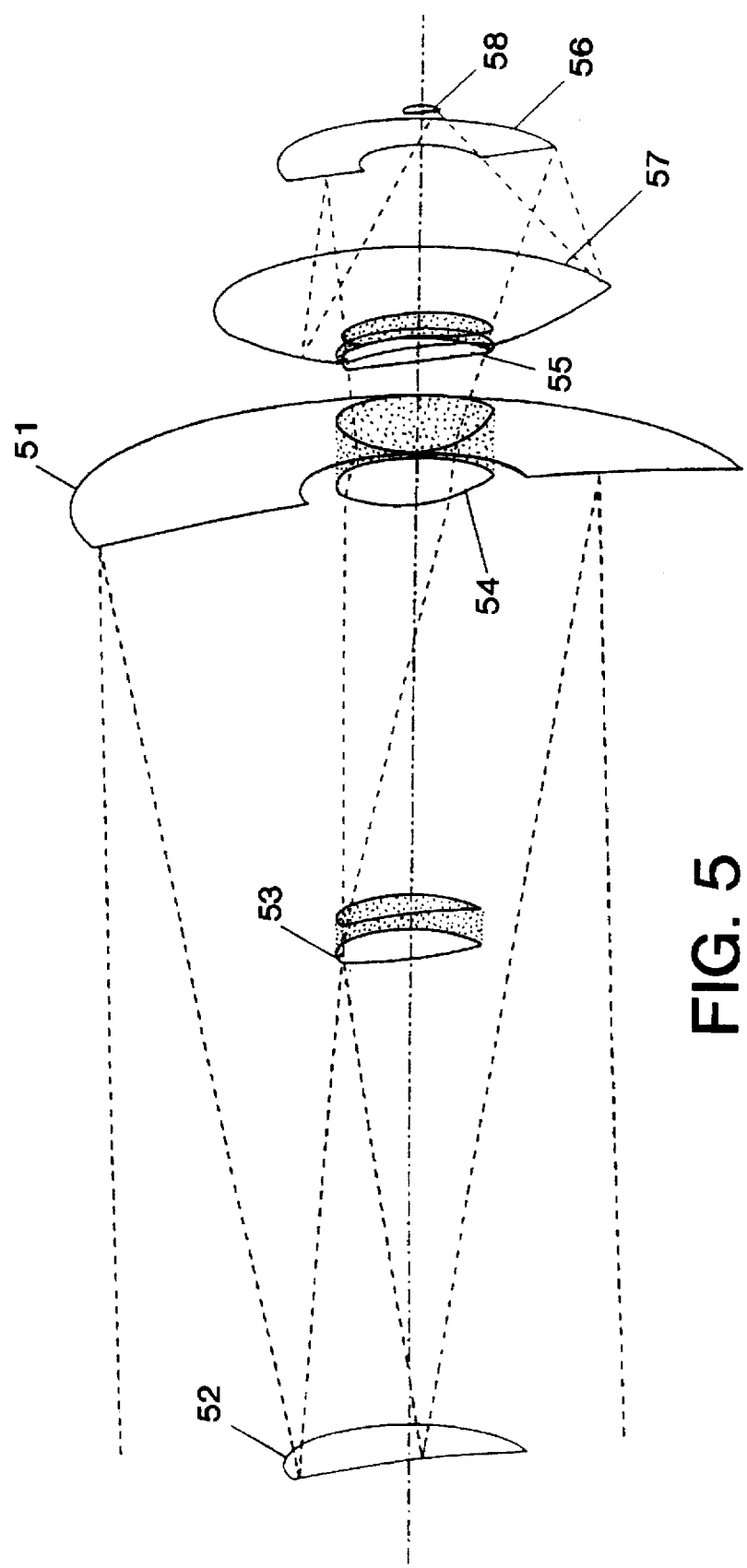
FIG. 5 is a schematic perspective view of one embodiment of the invention.

FIG. 5 shows the layout resulting from the merge with meridional rays shown at 1.83 degrees off axis. The system has a primary mirror 51, a secondary mirror 52 and a field/transfer lens 53. The system also includes a corrector group 54 and 55 (the equivalent of meniscus 44 and doublet 45 in FIG. 4) and a folding flat 56 and relay mirror 57.

Also visible in FIG. 5 is the small weak field flattener 58 which delineates the final flat focal surface. In this particular design, the field flattener lens 58 is intended to be optically cemented to the otherwise uncovered silicon structure of the CCD detector. This minimizes additional aberrations contributed by the field flattener 58 and serves to protect the CCD surface from contaminants. Separation of this lens from the focal surface would cause it to intrude too far into the f/1 ray cone with implicit degradation of the image sharpness.

As shown in the system in FIG. 5, the characteristics of this system can be summarized as:

(a) the focal power resides in the mirrors, and so is non-chromatic.

(b) the spherical mirrors are optically concentric, thus eliminating coma and astigmatism when the aperture stop is located at the center of curvature (or at the optical equivalent).

(c) spherical aberration correction is the only remaining necessary adjunct to the reflective optical elements. This is the function of the corrector group, necessarily associated with the field/transfer group for net chromatic correction of the refractive components.

(d) the residual aberrations are low-amplitude combinations of secondary color with weak high-order coma and astigmatism, generated primarily at the non-concentric surfaces of the field/transfer group.

(e) vignetting is minimal. The central obscuration is determined by the perforations in the folding and relay mirrors, provided that the design is adjusted so as to image the secondary mirror into space between them. In the Examples 1 below, the central obscuration is about 31.2% on axis, increasing to 33% at the circumference of the 11 mm diameter image.

(f) distortion is minimal, with an amplitude generally less than that of the blur spot dimensions.

To minimize future fabrication costs, the example designs make use of common radii of curvature on some of the refractive components. Although non-optimum for residual aberration correction, the difference in performance is negligible.

The three following examples demonstrate very different variants of the basic design, a 200 mm aperture f/0.9 visible/NIR, a 100 mm aperture f/0.8 visible/NIR and 200 mm aperture thermal infrared version. The specification tables are based on a coordinate system in which the z-axis is the optical axis and the x and y-axes are mutually orthogonal to it. In these design examples the origin is the center of curvature of the primary mirror. "D" and "d" are the outside and inside diameters of annuli. The shape of the aspheric trimmer profile is defined by the polynomial equation: $z = c \cdot x^2/2 + a_2 X^4 + a_6 X^6 + a_8 X^8$ where c is the curvature, x is the x-coordinate and $a_n$ are the coefficients.

The bandpass for this class of the system is intended to match the spectral sensitivity of generic silicon CCD devices, for which the highest response lies between 450 and 1100 nm. The corresponding refractive index data for optical glass is published for the spectral lines g, e, d, C, r, s and $n_{1060.0}^\circ$ amongst others, providing a good coverage for analytic purposes.

The initial ray-tracing process always shows some coma as the dominant residual aberration, emanating from the off-axis functioning of the field/transfer group. This is largely corrected by introducing equal and opposite coma within the concentric Cassegrain subsystem, the technique chosen here being that of increasing the focal length of the field/transfer group so as to make the transfer imperfectly concentric. The effect of this procedure is to displace the center of the entrance pupil away from the classical Schmidt location (at the center of curvature of the primary mirror), and laterally proportionate of off-axis angle, thus effecting the required compensation. Ray tracing is performed thereafter by ensuring that the aperture stop, located at the aspheric surface, accurately delineates the marginal rays for each spectral line.

The median ray aberration graphs which follow, have as their vertical axes the height of the ray in the entrance pupil not labelled. The horizontal axis gives the lateral position of the intercept with the focal plane.

The 2D histograms are normalized in amplitude; any significant fine structure is derived from the line-spectrum ray trace. The most relevant feature is the maximum extent of the "footprint" on the 32×32 μm focal patch.

EXAMPLE 1

| Surface | Glass | Z (vertex) | Curvature | Radius | Surface Type | diam | Diam |
|---|---|---|---|---|---|---|---|
| 0 | | 618 | | | Obstruction | 95 | |
| 1 | | 1016 | −0.0009843 | −1016 | Mirror | 85 | 255 |
| 2 | | 633.5 | −0.0015785 | −633.5 | Mirror | | 92 |
| 3 | | 830 | 0.0046904 | 213.2 | Lens | | 55 |
| 4 | SK 11 | 848 | −0.0052549 | −190.3 | Lens | | 55 |
| 5 | | 1009.45 | 0.01619433 | 61.75 | Lens | | 60 |
| 6 | SK 4 | 1029.27 | 0.02384927 | 41.93 | Lens | | 60 |
| 7 | | 1065 | 0 | flat | Lens | | 56.5 |
| 8 | F 4 | 1071 | −0.0072275 | −138.4 | Lens | | 56.5 |

-continued

| Surface | Glass | Z (vertex) | Curvature | Radius | Surface Type | diam | Diam |
|---|---|---|---|---|---|---|---|
| 9 | SK 4 | 1075 | 0 | | flat – asph Lens (Stop) | | 56.5 |
| 10 | | 1143.6 | 0 | | flat Mirror | 47 | 105 |
| 11 | | 1065 | 0.00679348 | 147.2 | Mirror | 60 | 150 |
| 12 | | 1163.67 | 0.03298915 | 30.31 | Lens | | 12 |
| 13 | SF 2 | 1164.67 | 0 | | flat focus | | 12 |

Figure 6:
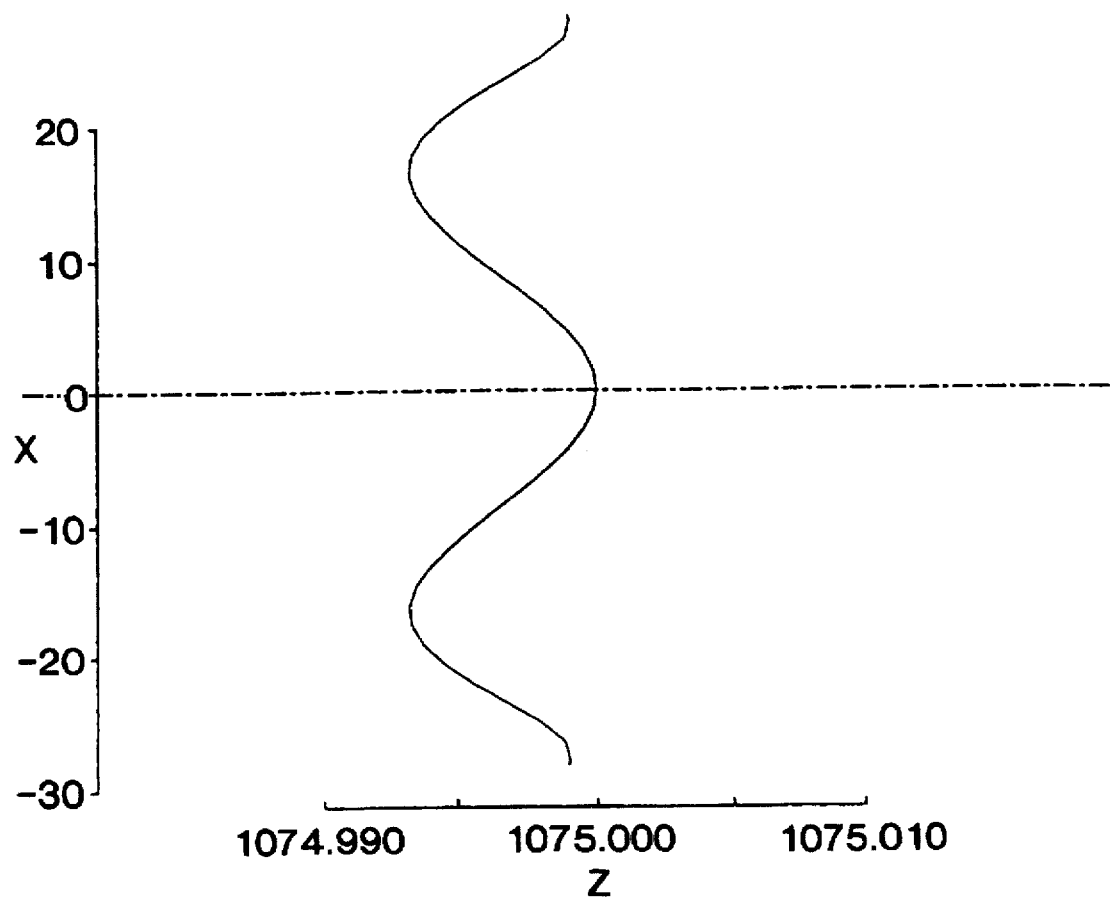
FIG. 6 is a profile of the asphere of an embodiment of the invention in accordance with Example 1.
Figure 7:
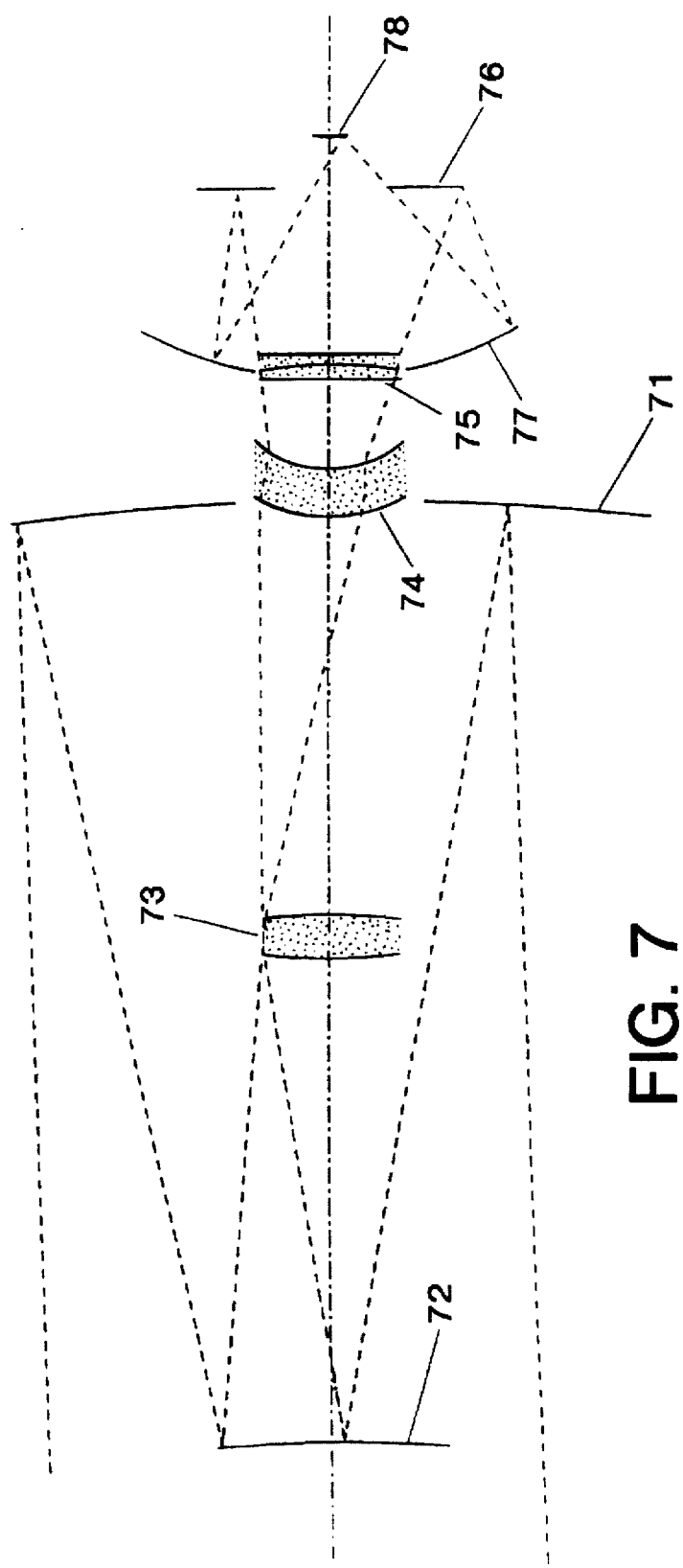
FIG. 7 is a cross-sectional, side elevation view of the system of Example 1.
Figure 8:
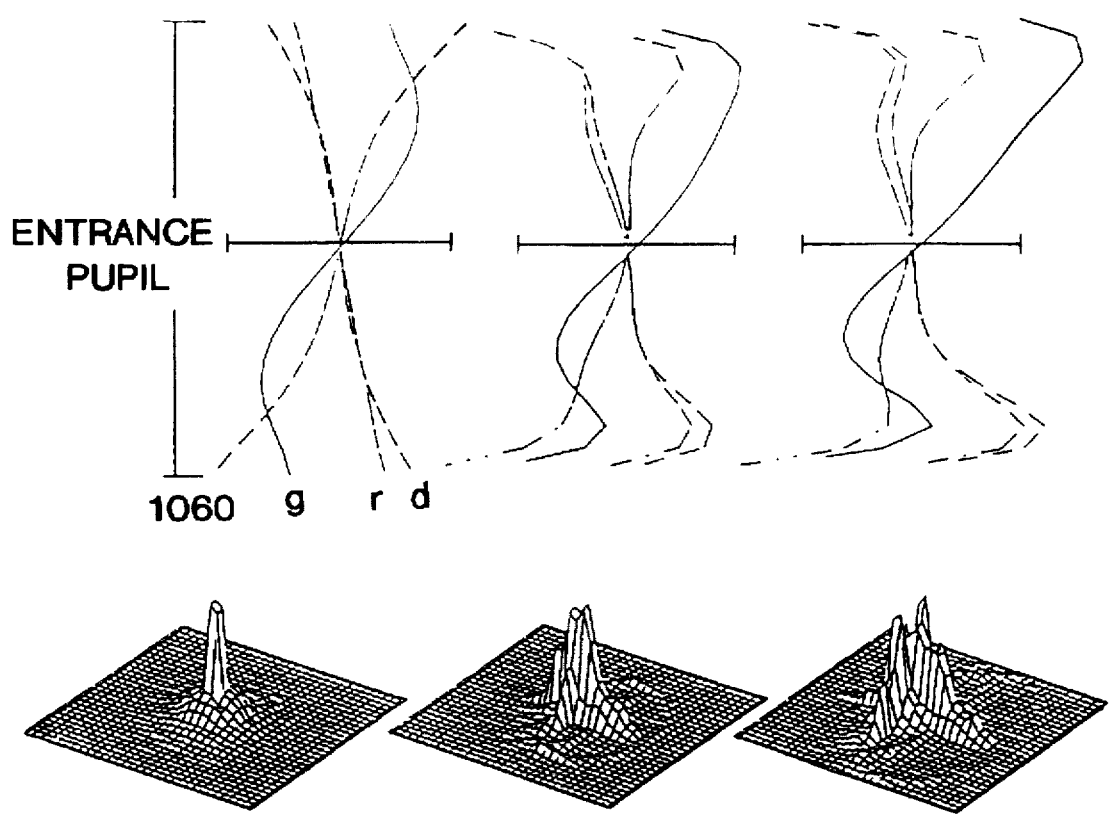
FIG. 8 is a graphical illustration of the performance of the system of Example 1.

Asperic Coefficients of Surface 9
A2 −5.50E−05
A4 1.281E−07
A6 −5.88E−11
A8 −2.18E−14
Entrance Pupil Diam. = 200 m
Focal Length = 173.2 mm
Geometrical Focal Ratio = 0.87
Central obscuration = 31.2%
Bandpass = 436 nm to 1060 nm The profile is illustrated in FIG. 6. Note that the z-axis is expanded by a factor of 2000 relative to the (vertical) x-axis. FIG. 7 provides a side elevation of this example design, wherein reference numerals 71–78 respectively represent components corresponding to reference numerals 51–58 in FIG. 5. FIG. 8 gives a graphical illustration of the computed performance.

FIG. 8 shows median ray focal plane intercept diagrams and 2D histograms for the 200 mm f/0.87 system of Example 1. From left to right, the off-axis angle is 0°, 1.094° and 1.455°, corresponding to 0, 3.3 and 4.4 mm distance from the axis. In the median ray diagrams four spectral lines are shown: g (436 nm), d (588 nm), r(707 nm) and 1060 nm. The horizontal bar represents 20 µm. The histograms show the focal plane illuminance from a stellar source in a 32 µm square.

As the 2D histograms show all the energy from 436 to 1060 nm is focused into only part of the 32×32 µm focal area even at 1.455° off axis (the angular radius corresponding to the side of the 7×9 mm—or "⅔" inch video standard—image.

EXAMPLE 2

At EPDs significantly greater than 1 m, constraints on the new design system are imposed by the greater scale of spherical aberration at the concentric Cassegrain focus, which generates significant errors of mapping of the ideal entrance pupil onto the system aperture stop by the transfer lens. The resulting high-order aberrations tend to exceed acceptable levels relative to the pixel dimensions of the appropriate CCD detectors.

Example 2 describes a 1000-mm aperture version. There is an extra chromatic correction element used in the field/transfer component of the 1 m variant. This helps to trim back the outer parts of the blur spot which are caused by the extremes of the spectral bandpass.

Figure 9:
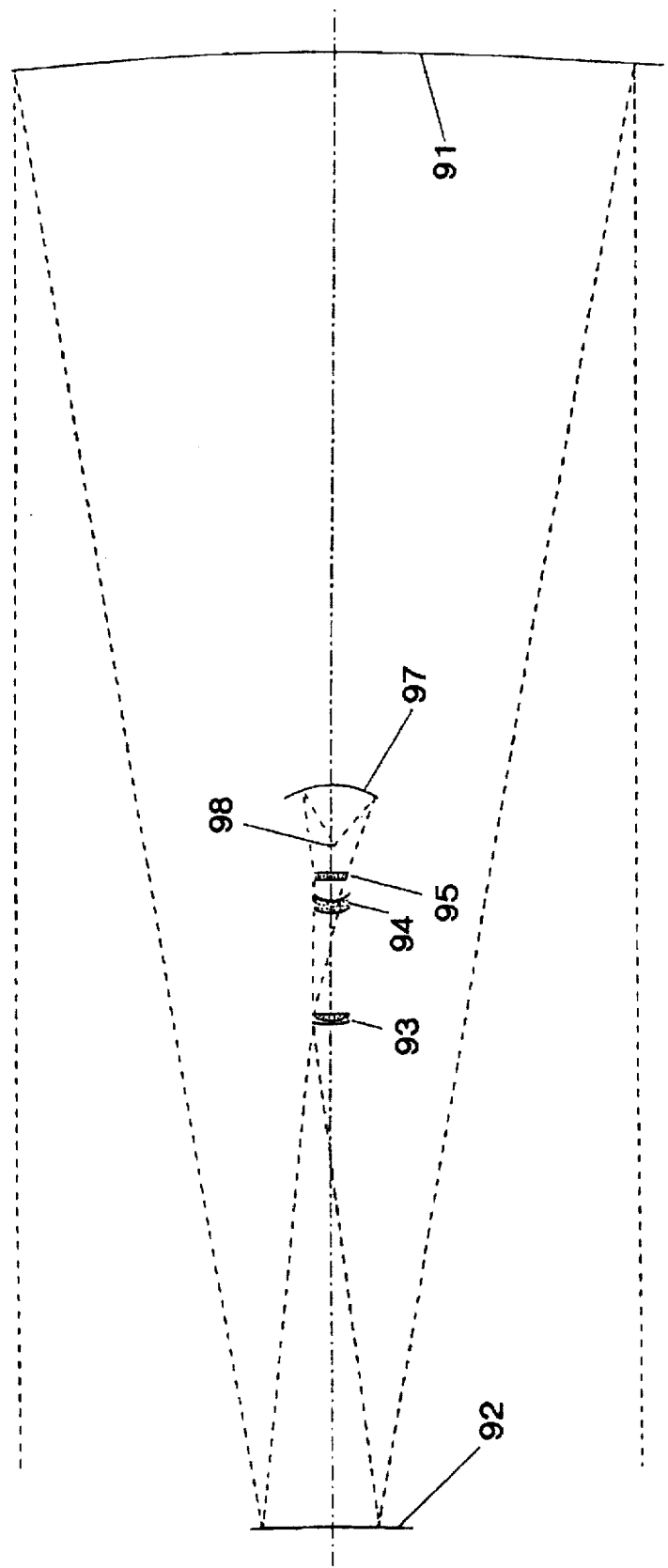
FIG. 9 is a cross-sectional, side elevation view of the system of Example 2.
Figure 10:
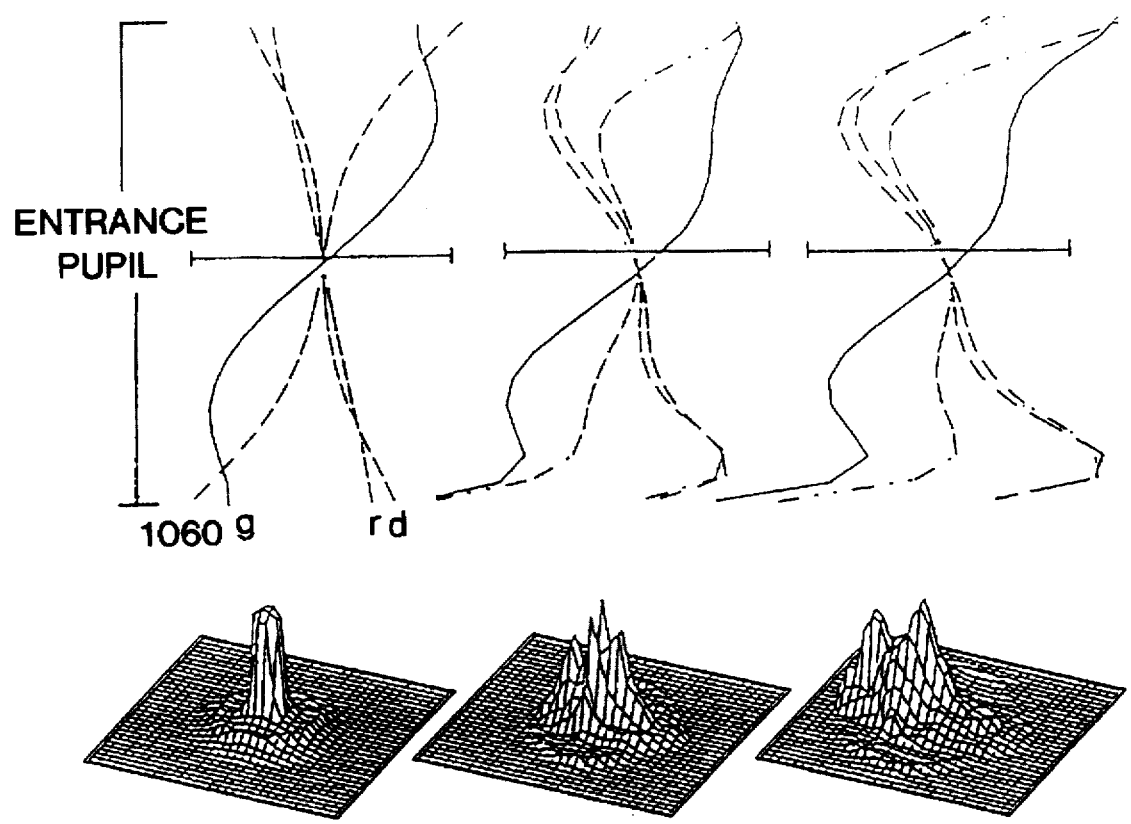
FIG. 10 is a graphical illustration of the performance of the system of Example 2.

FIG. 9 shows for Example 2 the side view of the optical layout wherein reference numerals 91–95 and 97–98 respectively represent components corresponding to reference numerals 51–55 and 57–58 in FIG. 5, and FIG. 10 gives a graphic illustration of the computer median ray and blur spot performance. FIG. 10 shows the median ray focal plane intercept diagrams and 2D histograms for the 1 m f/0.82 system of Example 2. From left to right, the off-axis angle is 0°, 0.217° and 0.289°, corresponding to 0, 3.3 and 4.4 mm distance from the axis. In the median ray diagrams four

| Surface | Glass | Z (vertex) | Curvature | Radius | Surface Type | diam | Diam |
|---|---|---|---|---|---|---|---|
| 0 | | 3550 | | | Obstruction | 250 | |
| 1 | | 6000 | −0.0001667 | −6000 | Mirror | | 1045 |
| 2 | | 3575 | −0.0002797 | −3575 | Mirror | | 250 |
| 3 | | 4401 | 0.0069004 | 144.9 | Lens | | 62 |
| 4 | F 4 | 4407 | 0.0187758 | 53.26 | Lens | | 62 |
| 5 | SK 4 | 4419 | −0.0004764 | −2099 | Lens | | 62 |
| 6 | | 4580.5 | 0.01619433 | 61.75 | Lens | | 58 |
| 7 | SK 4 | 4602.25 | 0.025 | 40 | Lens | | 58 |
| 8 | | 4636 | 0 | flat | Lens | | 55 |
| 9 | F 4 | 4642.25 | −0.0085063 | −117.6 | Lens | | 55 |
| 10 | SK 4 | 4646 | 0 | | flat + asph Lens (Stop) | | 54.6 |
| 11 | | 4793.2 | −0.0067935 | −147.2 | Mirror | | 155 |
| 12 | | 4693.241 | −0.03365497 | −27.36 | Lens | | 14 |
| 13 | SF 2 | 4692.241 | 0 | flat | focus | | 14 |

Aspheric Coefficients of Surface 10
A2 = −9.6E−05
A4 = 2.206E−07
A6 = −9.976E−11
A8 = −3.159E−14
Entrance Pupil Diam. = 1000 mm
Focal Length = 814.8 mm
Geometrical Focal Ratio = 0.82
Entral Obscuration = 6.3%
Bandpass = 436 nm to 1060 nm spectral lines are shown; g (436 nm), d (588 nm), r (707 nm) and 1060 nm. The horizontal bar represents 20 µm. The 2D histograms show the focal plane illuminance from a stellar source in a 32 µm square.

THERMAL INFRARED VARIANT

It is clear that other regions of the spectrum can be utilized, given the appropriate detectors and refractive media to which this design principle can be adapted. In recent years, arrays of thermal infrared detectors have been fabricated, the most useful in the context of the new imaging system being the Pt:Pt-Si CCD arrays that are now commercially available. With useful spectral sensitivity in the spectral domain 3.5–5.5 µm, these detectors have overall and pixel dimensions similar to those of the normal visible/NIR silicon imagers.

Moreover, in the 3.5–5.5 µm spectral domain, Germanium is a low-cost, easily worked optical medium suited to the refractive components of the fast relay, with the benefit that the high refractive index allows large reductions in the spherical curvatures of the field/transfer lens giving a corresponding significant reduction of the high-order aberrations which limit the high-NA off-axis performance of the visible/NIR version of this design.

EXAMPLE 3 the cryostat subsystem. The cryostat window is usually made as an optical flat, but with a high-NA optics in this design, it is more appropriate to fabricate the window as a concentric meniscus 119 with its center of curvature (COC) coincident with the reflection of the common COC created by the folding flat. A perspective view is shown in FIG. 12 wherein reference numerals 124–129 respectively represent components corresponding to reference numerals 114–119 in FIG. 11. This window then contributes to the corrective negative spherical aberration of the system and introduces no off-axis aberrations.

Figure 13:
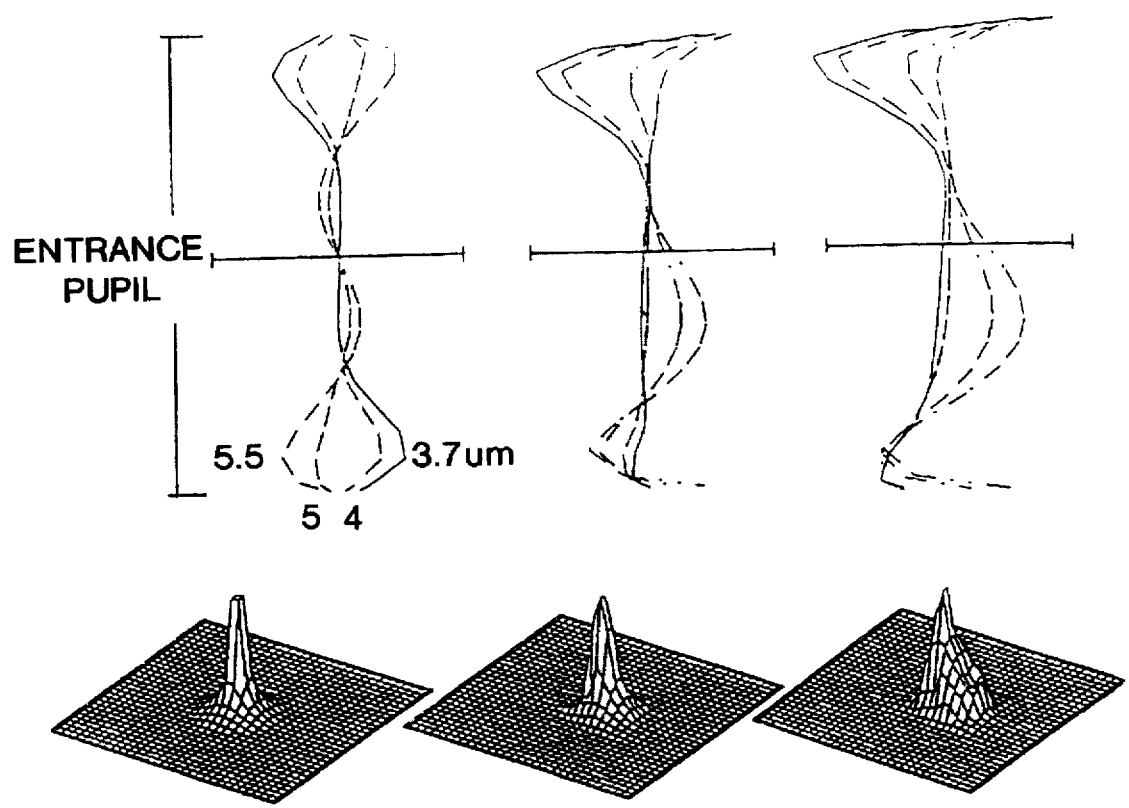
FIG. 13 is a graphical illustration of the performance of the system of Example 3.

FIG. 13 illustrates the computed performance of the median ray bundles and of the blur spot. FIG. 13 shows the median ray focal plane intercept diagrams and 2D histograms for the 200 mm f/0.93 system of Example 3. From left to right, the off-axis angle is 0°, 1.043° and 1.39°, corresponding to 0, 3.3 and 4.4 mm distance from the axis. In the median ray diagrams four spectral lines are shown: 3.7, 4.0, 5.0 and 5.5 µm. The horizontal bar represents 20 µm. The 2D histograms show the focal plane illuminance from a stellar source in a 32 µm square.

SCALING

All three examples given here are based on the use of a "⅔ inch" video standard CCD detector, which effectively determines the linear dimensions of the fast relay subsystem for

| Surface | Glass | Z (vertex) | Curvature | Radius | Surface Type | diam | Diam |
|---|---|---|---|---|---|---|---|
| 0 | | 620 | | | Obstruction | 88 | |
| 1 | | 1000 | −0.002 | −1000 | Mirror | 80 | 260 |
| 2 | | 625 | −0.0016 | −625 | Mirror | | 88 |
| 3 | | 836.31 | 0.001523 | 656.6 | Lens | | 54 |
| 4 | Ge | 846.31 | 0 | flat | Lens | | 54 |
| 5 | | 1082.11 | 0.01727414 | 57.89 | Lens | | 70 |
| 6 | Ge | 1089.35 | 0.01974334 | 50.65 | Lens | | 70 |
| 7 | | 1135 | 0.00021 | 4761.9 | Lens | | 70 |
| 8 | $AL_2O_3$ | 1140 | 0 | flat + asph | Lens (Stop) | | 70 |
| 9 | | 1232.5 | 0 | flat | Mirror | 53 | 125 |
| 10 | | 1125 | 0.005 | 200 | Mirror | 75 | 180 |
| 11 | | 1244.13 | 0.01236553 | 80.87 | Lens | | 33 |
| 12 | Ge | 1248.41 | 0.01305654 | 76.59 | Lens | | 33 |
| 13 | | 1260.374 | 0.02457032 | 46.36 | Lens | | 12 |
| 14 | $AL_2O_3$ | 1261.374 | 0 | flat | focus | | 12 |

Aspheric Coefficients of Surface 9
A2 −1.14E−05
A4 5.19E−08
A6 −1.03E−11
A8 −9.00E−15
Entrance Pupil Diam. = 196 mm
Focal Length = 181.2 mm
Geometrical Focal Ratio = 0.93
Central obscuration = 29%
Bandpass = 3.7 – 5.5 µm The table of Example 3 lists the optical design of a thermal version of the new system, comparable in most characteristics to those of the example given in Table 1. The significant differences in detail include the use at the aperture stop of a synthetic sapphire spectral dispersion corrector which has only a singlet format, but which has a weak positive power exactly sufficient for the associated positive longitudinal chromatic aberration to correct the negative chromatic aberration of the Germanium concentric meniscus corrector over the spectral band 3.7–5.5 µm.

Figure 11:
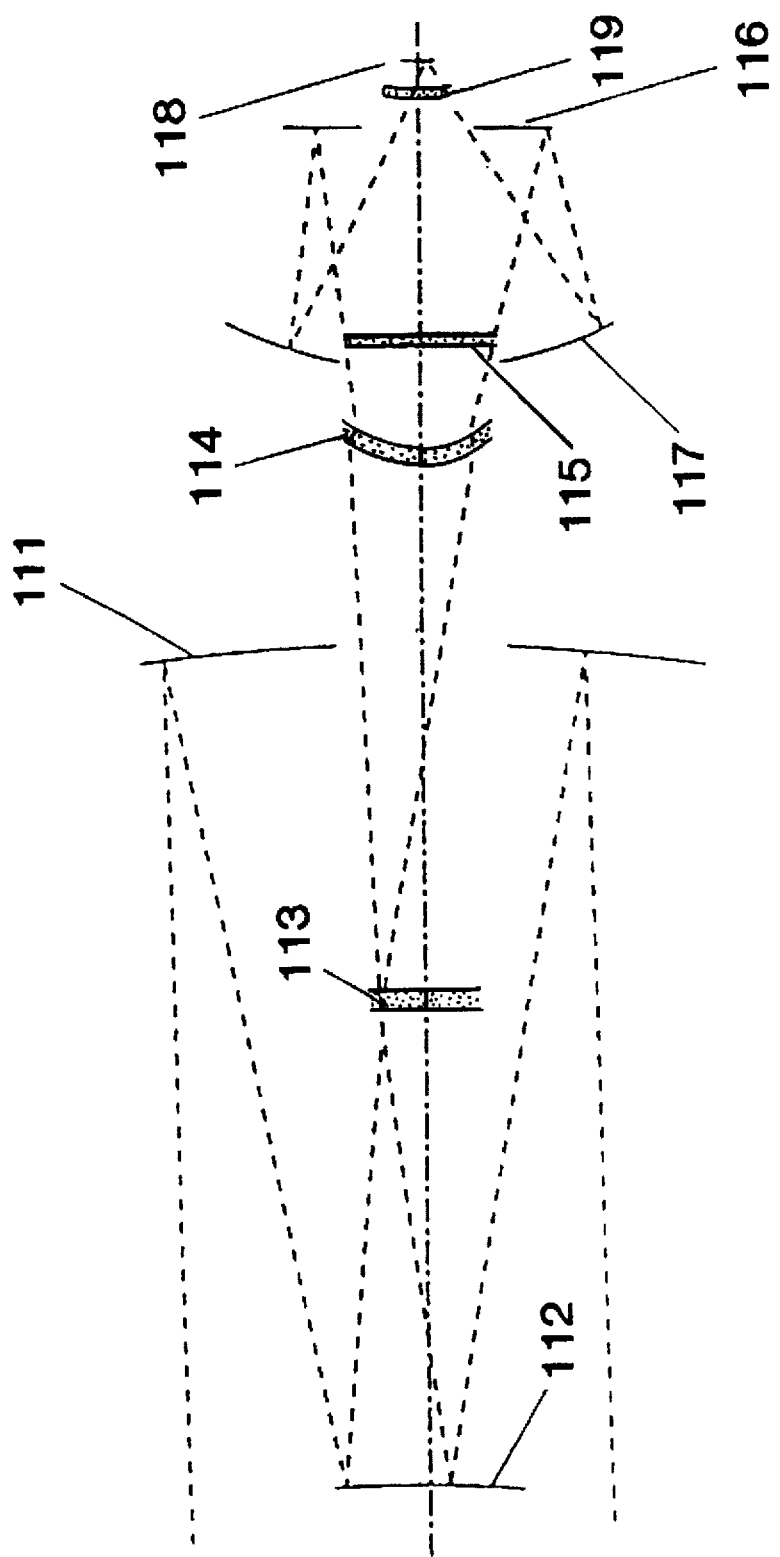
FIG. 11 is a cross-sectional, side elevation view of the system of Example 3.
Figure 12:
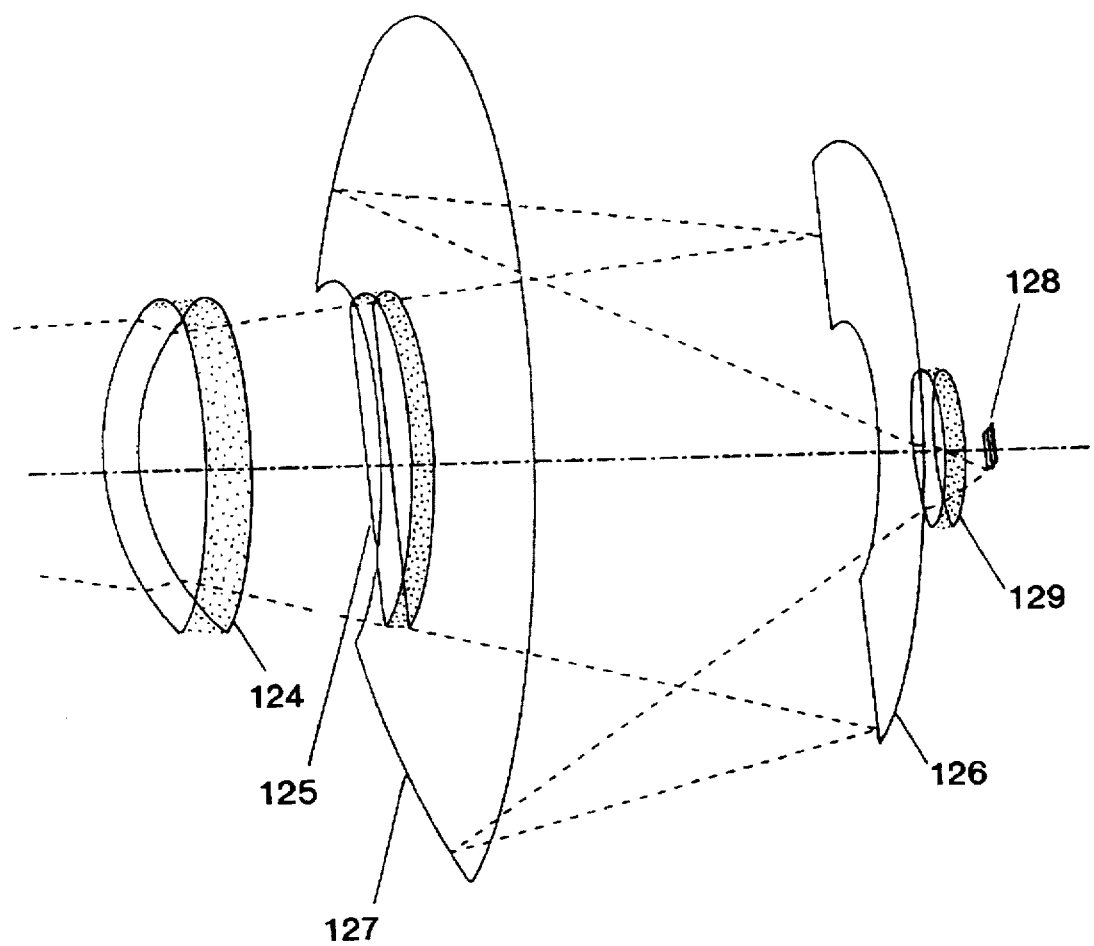
FIG. 12 is a perspective cross-sectional view of an alternative form of the relay which includes a concentric window for a cryostat.

FIG. 11 shows the side view of the optical layout, wherein reference numerals 111–118 respectively represent components corresponding to reference numerals 51–58 in FIG. 5. An essential component of a thermal camera of this type is a specified NA. Other detector dimensions may require modification of the relay to provide the appropriate combination of speed, linear field at the field/transfer lens, and residual aberration blur.

From the three examples of embodiments of the invention above, it can be seen how, once the detector/relay combination has been initially determined, the Cassegrain components can then be established which will match the required object field angle to the linear field of the relay. Melding of the two subsystems is then achieved by detailed adaptation of the field/transfer and corrector components.

Figure 14A:
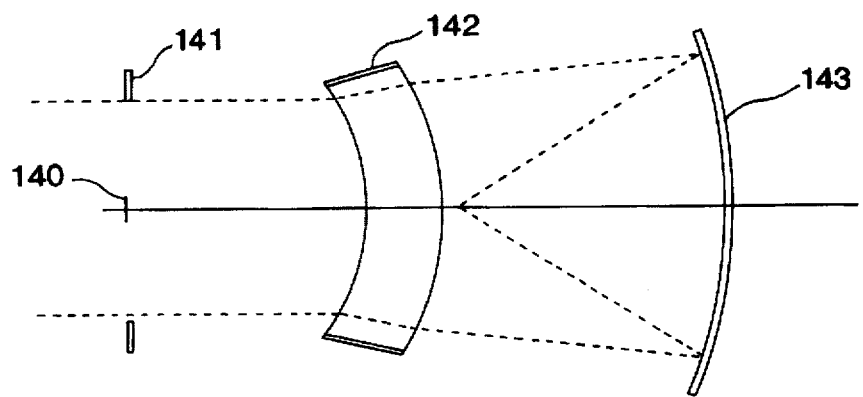
FIGS. 14a, 14b and 14c are illustrations of prior art Maksutov and Bouwers, Baker, and Hawkins & Linfoot cameras, respectively, which can be modified to provide concentric spherical focal reducers in a preferred form of the invention.
Figure 14B:
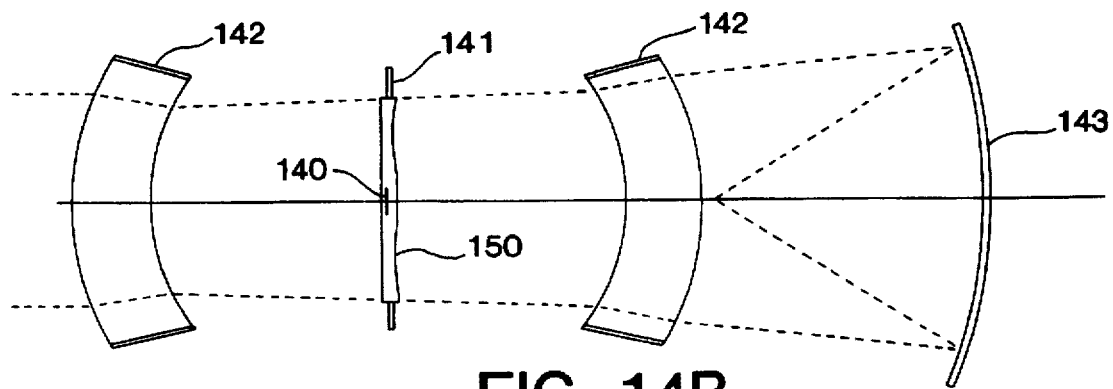
Figure 14C:
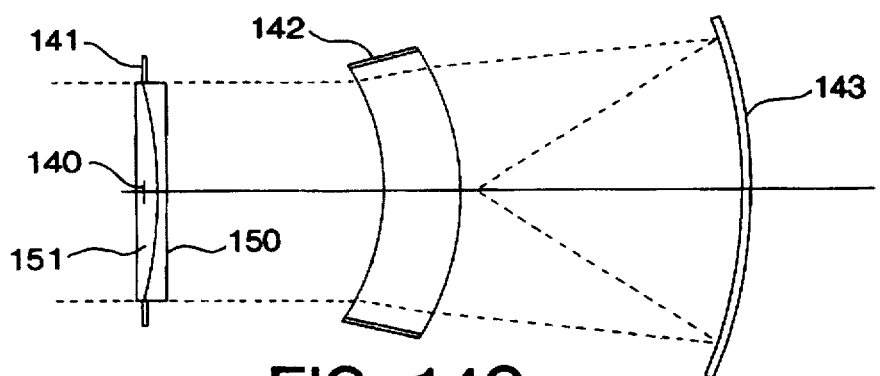

Three of the preferred cameras namely modified forms of: Baker; Hawkins and Linfoot; and Maksutov or Bouwers which preferably form the group from which the concentric focal reducer is selected will now be desirable and are illustrated in FIGS. 14a, 14b and 14c.

All three examples have the center of curvature 140 at the center of the Aperture Stop 141 and all three employ a spherically surfaced Meniscus Corrector 142 to control the spherical aberration of the spherical imaging mirror 143.

The Bouwers camera employs a concentric meniscus corrector 142 which leaves chromatic aberration uncorrected, while the independently invented Maksutov system uses a slightly non-concentric version of the meniscus corrector 142 which corrects chromatic aberration but re-introduces a small amount of coma.

The Baker design (U.S. Pat. No. 2,458,132) includes a pair of slightly concentric achromatic menisci 142, 142A, together with a weak Schmidt aspheric corrector 150 to give a high degree of correction at the expense of length and complexity, but with the advantage of very high speeds (typically f/0.8).

The Hawkins & Linfoot camera combines the advantages of the truly concentric meniscus, as used by Bouwers, and the supplementary Schmidt-type aspheric corrector employed by Baker, but avoids the need for the lengthy system of symmetrical menisci of Baker by correcting the chromatic aberration of the concentric meniscus with a doublet lens of zero power 151.

The improvement in image quality achieved by the invention over previous designs is evidenced by a greatly increased (and virtually unvignetted) image brightness combined with a uniformity high sharpness over the whole image. Obviously the most appropriate applications are where existing designs do not fully resolve the conflict between low light levels and the requirement for high data acquisition rates and high quality image parameters.

Four areas of interest are:

(a) Astrography, including astrometry and fast multiple-point photometry, (b) Remote sensing from aircraft and orbiting satellites, (c) Security surveillance, especially nocturnal, (d) High speed frame capture. E.g. fast electronic shuttering of moving objects.

A previously unattainable performance has been made possible by the invention. Although the only component required to have the full aperture diameter is a single spherical mirror, it is possible to achieve focal ratios of f/1 or faster, entrance pupils up to at least 600 mm diameter, and up to 3.3° unvignetted fields with uniform resolution of <3 arcsec rms and 500 nm spectral bandwidth.

As a result it is now more feasible and cost effective to achieve difficult applications in low light level and high data rate imaging. Application areas where these characteristics are most effectively used include: astrographic, astrometric, photometric measurements; remote sensing; security surveillance; and several applications where the brighter image allows faster electronic shutter speeds to be used in the video recording of moving objects for later slow-motion or "freeze-frame" playback.

While the highest performance is evident in the matching of the optical system to CCD arrays, the inventive principle of transferred center of curvature is applicable to other detector input requirements, and to the modification of some existing telescope/camera formats.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

We claim:

1. A lens system comprising:

a primary mirror having a spherical reflective surface;

a secondary mirror having a spherical reflective surface, said primary and secondary mirrors having a common center of curvature and being constructed and arranged so that the image of a distant object formed by the two mirrors falls rearwardly of at least said secondary mirror;

transfer lens means located at or close to said image for optically transferring said common center of curvature of said primary and secondary mirrors to a location rearwardly of said transfer lens means;

image relay means having an aperture stop with a geometric center and located so that said center of said aperture stop coincides with said optically transferred common center of curvature of said primary and secondary mirrors; and correction means positioned at or near said aperture stop to correct said image prior to receipt thereof at an image receiving station.

2. A lens system as claimed in claim 1 wherein:

said transfer lens means comprises a lens operable to optically transfer said common center of curvature of said primary and secondary mirrors to a location coincident with said center of said aperture stop of said image relay means.

3. A lens system as claimed in claim 2 wherein:

said correction means comprises a meniscus corrector having a geometric center.

4. A lens system as claimed in claim 3, wherein:

said meniscus corrector has curvatures concentric with said geometric center of said aperture stop.

5. A lens system as claimed in claim 1 and further comprising:

optical relay means comprising a spherical relay mirror having a curvature and operable to perform a focusing function; and wherein said correction means comprises a plurality of corrector elements located on the incident side of said spherical relay mirror, at least some of said corrector elements having surfaces concentric with said curvature of said spherical relay mirror and being operable to correct for spherical aberration and chromatic aberration induced by at least one of said corrector elements and said spherical relay mirror.

6. A lens system as claimed in claim 5 wherein:

said corrector elements comprise refractive elements.

7. A lens system as claimed in claim 6 wherein:

said refractive elements each comprise both singlet and color correcting doublets.

8. A lens system as claimed in claim 7 wherein:

said image relay means further comprises a very weak aspheric correcting surface at said aperture stop to remove residual high-order zonal aberrations.

9. A lens system as claimed in claim 8 wherein:

said image relay means further comprises a field flattening lens proximate to said image receiving station.

10. A lens system as claimed in claim 7 wherein:

said spherical mirror comprises a central aperture and is located at said aperture stop; and a plane mirror is provided to reflect incident light onto said spherical reflective surface of said spherical relay mirror.

11. A lens system as claimed in claim 1 and further comprising:

optical relay means including a spherical reflecting surface;

optical correcting means located on the incident side of said spherical reflecting surface and being operable to correct for primary spherical aberration, said optical correcting means comprising refractive elements having surfaces concentric with said spherical reflecting surface, said refractive elements and said spherical reflecting surface having a common axis of symmetry.

12. A lens system as claimed in claim 11 wherein:

said optical correcting means are located on the side of said common center of curvature opposite said spherical reflecting surface of said optical relay means.

13. A lens system as claimed in claim 11 wherein:

said optical correcting means are located on the same side of said common center of curvature as said spherical reflecting surface of said optical relay means; and a plane mirror is provided for reflecting incident rays passing through said optical correcting means onto said spherical reflecting surface.

14. A lens system comprising:

a primary mirror having a spherical reflecting surface;

a secondary mirror having a spherical reflecting surface and being arranged to receive light reflected from said primary mirror, said primary and secondary mirrors having a common center of curvature;

image receiving means situated on or adjacent to the focal plane of a mirror system defined by said primary and secondary mirrors; and optical relay means comprising a spherical mirror having a curvature and operable to perform a focusing function and a plurality of corrector elements located on the incident side of said spherical mirror, each of said corrector elements having surfaces concentric with said curvature of said spherical mirror and being operable to correct for spherical aberration and chromatic aberration induced by at least one of said corrector elements and said spherical mirror.

15. A lens system as claimed in claim 14 wherein:

said corrector elements comprise refractive elements.

16. A lens system as claimed in claim 15 wherein:

said refractive elements each comprises achromatic doublets.

17. A lens system comprising:

a primary mirror having a spherical reflective surface;

a secondary mirror having a spherical reflecting surface and being arranged to receive light reflected from said primary mirror, said primary and secondary mirrors having a common center of curvature;

image receiving means situated on or adjacent to the focal plane of a mirror system defined by said primary and secondary mirrors; and optical relay means comprising a spherical reflecting surface, optical correcting means located on the incident side of said spherical reflecting surface and being operable to correct for primary spherical aberration, said optical correcting means comprising refractive elements having surfaces concentric with said spherical reflecting surface, said spherical reflecting surface and said refractive elements being symmetrical about a common axis of symmetry.

18. A lens system as claimed in claim 17 wherein:

said optical correcting means are located on the side of said common center of curvature opposite said spherical reflecting surface of said optical relay means.

19. A lens system as claimed in claim 17 wherein:

said optical correcting means are located on the same side of said common center of curvature as said spherical reflecting surface of said optical relay means; and a plane mirror for reflecting incident rays passing through said correcting means onto said reflecting surface.

* * * * *